United States Patent
Inoo et al.

(10) Patent No.: US 7,259,877 B2
(45) Date of Patent: Aug. 21, 2007

(54) INSPECTION DEVICE AND IMAGE FORMING APPARATUS

(75) Inventors: Masaaki Inoo, Tokyo (JP); Tomokazu Nakamura, Chiba (JP); Yusuke Obuchi, Chiba (JP); Yoshiyuki Nakajima, Ibaraki (JP); Atsuteru Oikawa, Chiba (JP); Hitoshi Kato, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 10/610,584

(22) Filed: Jul. 2, 2003

(65) Prior Publication Data

US 2004/0066526 A1 Apr. 8, 2004

(30) Foreign Application Priority Data

Jul. 19, 2002 (JP) ............................ 2002-211148

(51) Int. Cl.
*G06F 3/12* (2006.01)
(52) U.S. Cl. ..................... 358/1.13; 358/504; 358/406; 399/83; 399/85
(58) Field of Classification Search ............... 358/1.15, 358/1.13, 504, 406; 399/83, 85
See application file for complete search history.

(56) References Cited

U.S. PATENT DOCUMENTS

| 4,630,129 A | 12/1986 | Hayashi et al. | 358/296 |
|---|---|---|---|
| 4,849,821 A * | 7/1989 | Allen et al. | 358/405 |
| 5,047,955 A | 9/1991 | Shope et al. | 364/519 |
| 6,175,426 B1 | 1/2001 | Hirooka | 358/1.9 |
| 6,377,758 B1 | 4/2002 | OuYang et al. | 399/15 |
| 6,639,687 B1 * | 10/2003 | Neilsen | 358/1.14 |
| 6,836,568 B1 * | 12/2004 | Morishita | 382/219 |

FOREIGN PATENT DOCUMENTS

| DE | 196 48 288 A1 | 5/1997 |
|---|---|---|
| EP | 0 501 334 A2 | 9/1992 |
| EP | 0 755 021 A2 | 1/1997 |
| EP | 1 372 044 A2 | 12/2003 |
| GB | 2 307 615 A | 5/1997 |
| JP | 03-19877 | 1/1991 |
| JP | 4-197764 | 7/1992 |
| JP | 4-216983 | 8/1992 |
| JP | 5-318888 | 12/1993 |
| JP | 2000-127571 | 5/2000 |
| JP | 2002-031990 | 1/2002 |
| JP | 2002-31990 | 1/2002 |

OTHER PUBLICATIONS

Patent Abstracts of Japan, Publication No. 04216983A, Aug. 7, 1992.
Patent Abstracts of Japan, Publication No. 2002031990A, Jan. 31, 2002.

* cited by examiner

*Primary Examiner*—Douglas Q. Tran
*Assistant Examiner*—Chan S. Park
(74) *Attorney, Agent, or Firm*—Fitzpatrick, Cella, Harper & Scinto

(57) ABSTRACT

An inspection device having a reading portion for reading an image on a sheet having an image formed thereon, a storage portion for storing therein image data read by the reading portion, and a selecting portion for selecting one of a first mode for storing the image data read by the reading portion in the storage portion, and a second mode for judging whether the image data read by the reading portion is similar to the image data stored in the storage portion.

4 Claims, 18 Drawing Sheets

P (i, j)

B (i, j)

INSPECTION DEVICE AND IMAGE FORMING APPARATUS

BACKGROUND OF THE INVENTION

1. Field of the Invention

The invention relates to an inspection device for inspecting a sheet outputted by an image forming apparatus.

2. Description of Related Art

As an image forming apparatus which, when image disturbance is caused by the state of the interior of the image forming apparatus, does not continuedly print a faulty image, but can warn and at the same time, can stop a printing operation and can rapidly cope with the difficulty, there is known an apparatus proposed in Japanese Patent Application Laid-Open No. 5-318888. In this apparatus, the presence or absence of image disturbance on a sheet has been judged by comparing the image signal of an image formed on a photosensitive member and an image signal obtained by reading an image on a sheet after fixing with each other by a comparing circuit.

In this conventional method, however, the image signal of the image formed on the photosensitive member is the object of comparison and therefore, when it is compared with an image signal obtained after the intervention of a photosensitive member, a fixing portion and a solid state image sensor, there has been the possibility that even a normal sheet which is originally free of image disturbance is recognized as a faulty sheet.

Also, comparison has been made by transmitting the image signal of the image formed on the photosensitive member to the comparing circuit, reading the image on the sheet outputted from the image forming apparatus by the solid state image sensor, and transmitting the image signal of the image read by the solid state image sensor to the comparing circuit and therefore, communication of a great deal of image data has been effected. This also has led to the problem that a great load is applied to communication means.

SUMMARY OF THE INVENTION

The present invention has been made in view of such a problem and an object thereof is to provide an inspection device for detecting any faulty sheet highly accurately, and reducing the load to communication means by the communication of image data.

The present invention provides an inspection device having a reading portion for reading an image on a sheet having an image formed thereon, a storage portion for storing therein image data read by the reading portion, and a selecting portion for selecting one of a first mode for storing the image data read by the reading portion in the storage portion, and a second mode for judging whether the image data read by the reading portion is similar to the image data stored in the storage portion.

Also, the present invention provides an image forming apparatus having a stacking portion for stacking sheets thereon, a feeding portion for feeding the sheet from the stacking portion, an image forming portion for forming an image on the sheet fed by the feeding portion, a reading portion for reading the image on the sheet on which the image has been formed by the image forming portion, a storage portion for storing therein image data read by the reading portion, a comparing portion for comparing the image data read by the reading portion with the image data stored in the storage portion, and a selecting portion for selecting one of a first mode for storing the image data read by the reading portion in the storage portion, and a second mode for judging whether the image data read by the reading portion is similar to the image data stored in the storage portion.

Also, the present invention provides an inspection device having a reading portion for reading an image on a sheet having an image formed thereon, an original image receiving portion for receiving the image data of an original, a storage portion for storing therein the image data received by the original image receiving portion, and a selecting portion for selecting one of a first mode for storing the image data received by the original image receiving portion in the storage portion, and also judging whether the image data received by the original image receiving portion is similar to the image data read by the reading portion, and a second mode for judging whether the image data read by the reading portion is similar to the image data stored in the storage portion.

Also, the present invention provides an image forming apparatus having a stacking portion for stacking sheets thereon, a feeding portion for feeding the sheet from the stacking portion, an image inputting portion for inputting an image to be formed on the sheet fed by the feeding portion, an image forming portion for forming an image on the sheet on the basis of image data inputted by the image inputting portion, an image reading portion for reading the image on the sheet on which the image has been formed by the image forming portion, a storage portion for storing therein the image data inputted by the image inputting portion, and a selecting portion for selecting one of a first mode for storing the image data inputted by the image inputting portion in the storage portion, and also judging whether the image data inputted by the image inputting portion is similar to the image data read by the image reading portion, and a second mode for judging whether the image data stored in the storage portion is similar to the image data read by the image reading portion.

Other objects and features of the present invention will become apparent from the following detailed description and the accompanying drawings.

DESCRIPTION OF THE PREFERRED EMBODIMENTS

Some preferred embodiments of the present invention will hereinafter the described in detailed by way of example with reference to the drawings. However, the dimensions, materials, shapes, relative disposition, etc. of constituent parts in these embodiments, unless specifically described, are not intended to restrict the scope of the present invention thereto.

Image forming apparatuses and inspection devices according to the embodiments of the present invention will hereinafter be described with reference to FIGS. 1 to 18. FIG. 2 shows the general construction of an image forming system according to an embodiment of the present invention, which is comprised of an image forming apparatus 100, an inspection device and a post-treating device 300.

Figure 3:
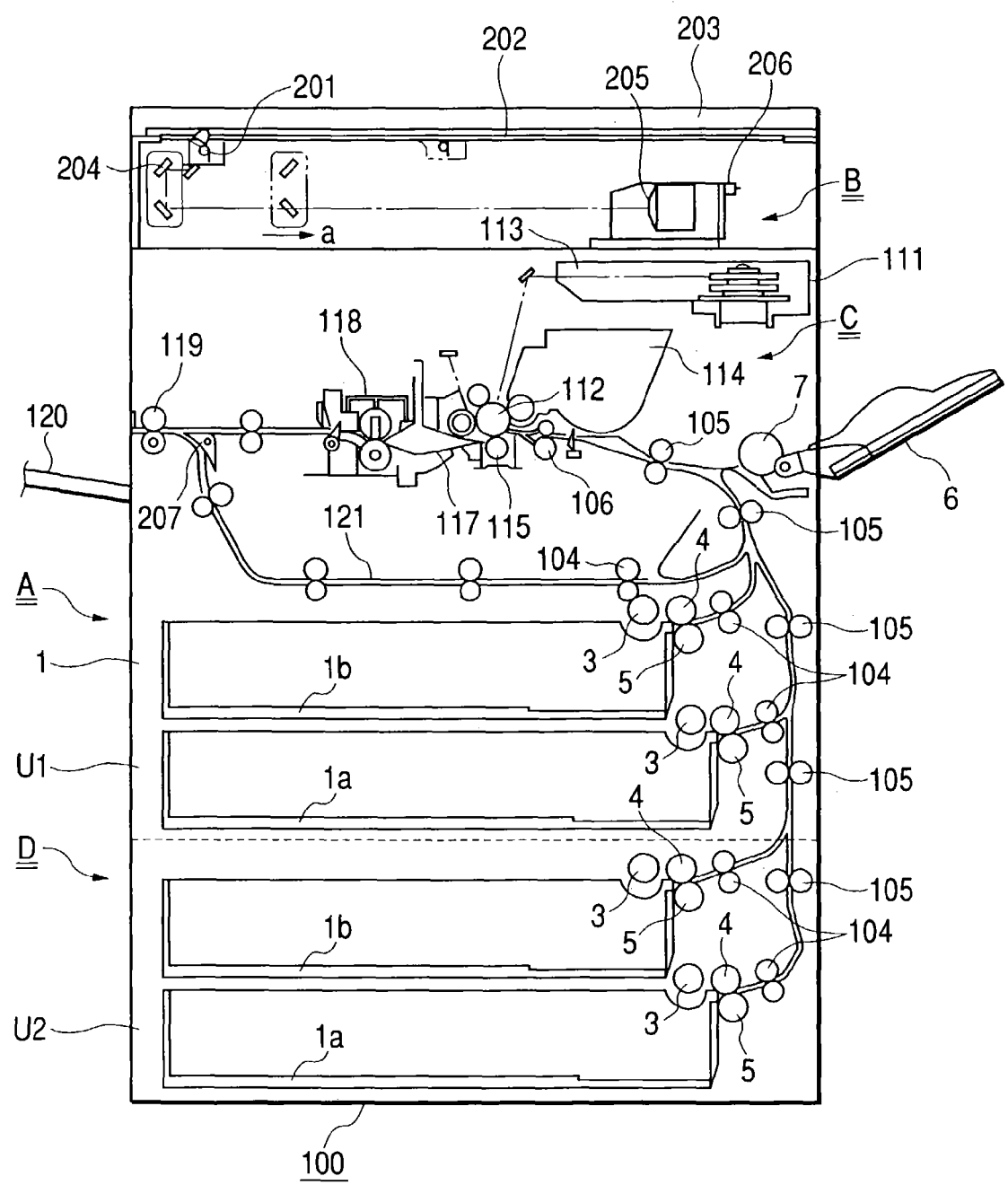
FIG. 3 shows the construction of an image forming apparatus.

Reference is first had to FIG. 3 to schematically describe the general construction of the image forming apparatus 100 in the embodiment of the present invention. In FIG. 3, the image forming apparatus 100 has in the upper portion thereof a scanner portion B which is an image reading portion for reading the image information of a book original, and has in the lower portion thereof an image forming portion C, and further has a sheet deck D assembled to the lower portion.

The scanner portion B is comprised of a scanning system light source 201, a platen glass plate 202, an original pressure plate 203 openable and closable relative to a scanning main body A, a mirror 204, a lens 205, a light receiving element (photoelectric conversion element) 206 and an image processing portion or the like. A book original such as a book, thick paper or curled paper or a sheet-shaped original or the like is placed on the platen glass plate 202 with the original surface thereof facing down, and is set in a stationary state with the back side thereof pressed by the original pressure plate 203, and a reading start key is depressed, whereupon the scanning system light source 201 scans the lower portion of the platen glass plate 202 in the direction indicated by the arrow in FIG. 3 and reads the image information of the original surface. The image information of the original exposed by the scanning system light source 201 and read by the light receiving element 206 is processed by the image processing portion, and is converted into an electrical signal, which is transmitted to a laser scanner 111.

The image forming apparatus 100 will function as a copying machine if the processing signal of the image processing portion is inputted thereto, and will function as a printer if the output signal of a computer is inputted thereto. The image forming apparatus 100 will also function as a facsimile apparatus if it receives a signal from other facsimile apparatus or transmits the signal of the image processing portion to other facsimile apparatus.

On the other hand, a sheet cassette 1 is mounted in the lower portion of the image forming portion C and in the present embodiment, two feeding units U1 and U2 are mounted so that four cassettes may be mounted. Sheets contained in the cassettes 1a and 1b are paid away by pickup rollers 3, are separated and fed one by one by the cooperation between feed rollers 4 and retard rollers 5, and thereafter are transported by transport rollers 104 and 105, and are directed to registration rollers 106, and are fed to the image forming portion C by the registration rollers 106 in such a manner as to be synchronized with an image forming operation.

The image forming portion C is comprised of an electrophotographic photosensitive drum 112, an image writing optical system 113, a developing device 114 and a transfer charger 115. A laser beam corresponding to the image information which is emitted from the laser scanner 111 to the surface of the photosensitive drum 112 uniformly charged by the transfer charger 115 is scanned by the image writing optical system 113 to thereby form a latent image on the surface of the photosensitive drum 112, and this latent image is formed as a toner image by the developing device 114, and the toner image is transferred to a first side of the sheet transported in synchronism with the rotation of the photosensitive drum 112 by the registration rollers 106, by the transfer charger 115.

The reference numeral 117 designates a transporting portion for transporting the sheet on which the toner image has been formed, the reference numeral 118 denotes a fixing device, and the reference numeral 119 designates delivery rollers. The sheet having the toner image formed thereon is transported to the fixing device 118 by the transporting portion 117, and is heated and pressurized to thereby fix the toner image on the surface of the sheet, whereafter the sheet is delivered out of the image forming apparatus by the delivery rollers 119.

Also, when images are to be recorded on the two sides of the sheet, the sheet delivered from the fixing device 118 is nipped between the delivery rollers 119, and at a point of time whereat the trailing edge of the sheet has passed a branching-off point 207, the delivery rollers 119 are reversely rotated and the sheet is once placed on a sheet duplex tray 121, whereafter the sheet is transported by the transport rollers 104 and 105 and arrives at the registration rollers 106, and the reversed sheet is delivered after an image is formed on a second side thereof in the same manner as previously described.

Figure 4:
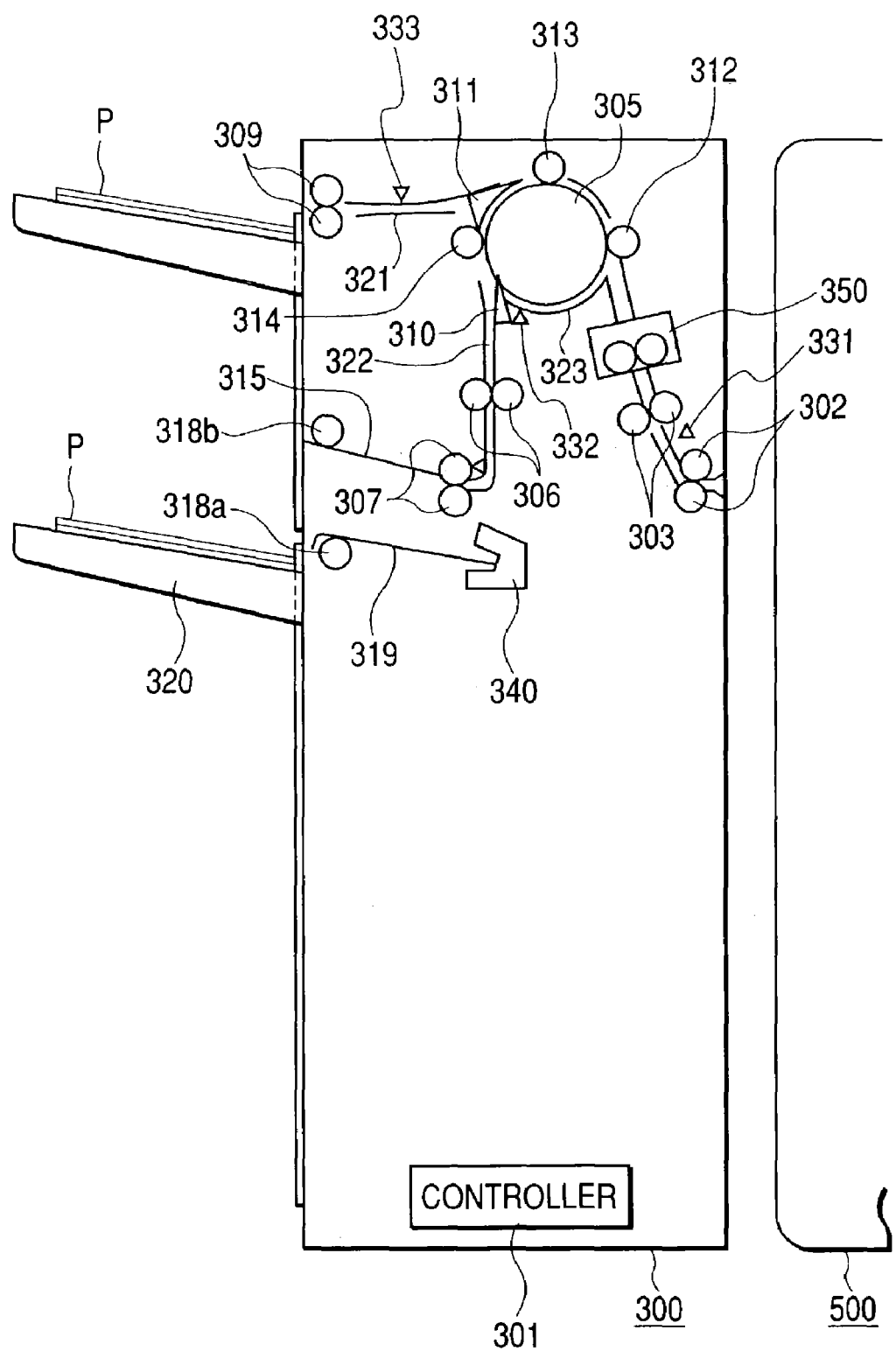
FIG. 4 shows the construction of a post-treating device.

The general construction of the post-treating device 300 will now be described with reference to FIG. 4. The post-treating device 300 receives the sheet delivered from the inspection device 500 from a pair of inlet rollers 302, and transports it to the interior thereof. A pair of transport rollers 303 are disposed downstream of the pair of inlet rollers 302, and a sheet detection sensor 331 is provided between the pair of inlet rollers 302 and the pair of transport rollers 303.

A punch unit 350 is disposed downstream of the pair of transport rollers 303, and a large transport roller 305 and pressing runners 312, 313 and 314 for pressing and transporting the sheet around the large transport roller 305 are disposed downstream the punch unit 350.

A changeover flapper 311 is adapted to effect the changeover of a non-sort path 321 and a sort path 322. A changeover flapper 310 disposed at the entrance of the sort path 322 is adapted to effect the changeover of the sort path 322 and a buffer path 323 for temporarily storing the sheet therein.

Transport rollers 306 are provided in the sort path 322. Design is made such that the temporary accumulation, alignment, stapling, etc. of sheets can be effected on an intermediate tray (hereinafter referred to as the "treating tray") 319 as a stacking tray disposed downstream of the sort path 322.

Delivery rollers 307 disposed at the exit of the sort path 322 is adapted to deliver the sheet onto the treating tray 319. An upper bundle delivery roller 318B is supported by a rockable guide 315, and is adapted to cooperate with a lower bundle delivery roller 318a to bundle-transport the sheets on the treating tray 319 and bundle-deliver them onto a stack tray 320 when the rockable guide 315 is moved to a closed position.

That is, the rockable guide 315 becomes inclined, and the lower bundle delivery roller 318a and the upper bundle delivery roller 318B together form a pair of rollers and bundle-transport the sheets on the treating tray 319.

Figure 1:
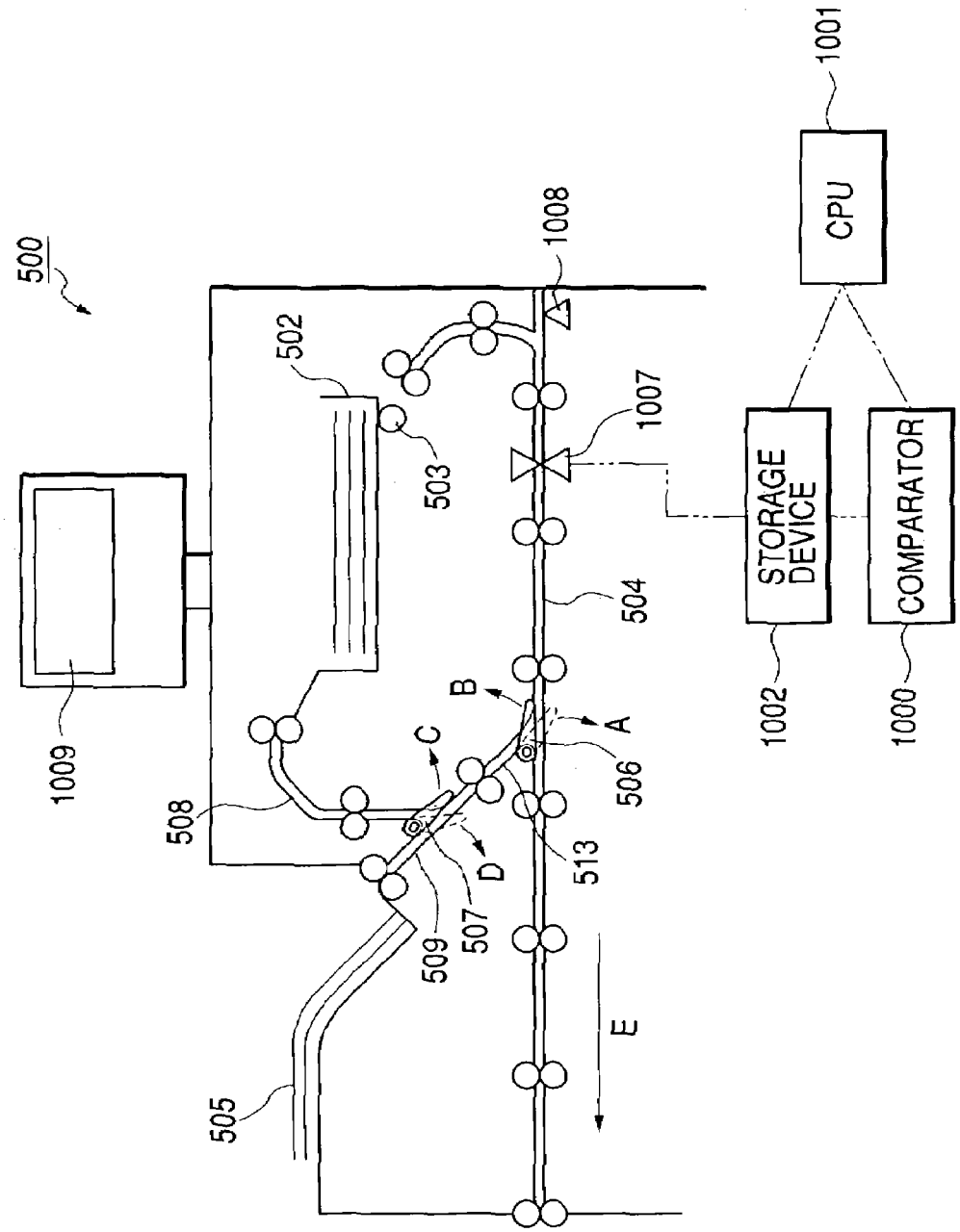
FIG. 1 shows the construction of an inspection device.
Figure 2:
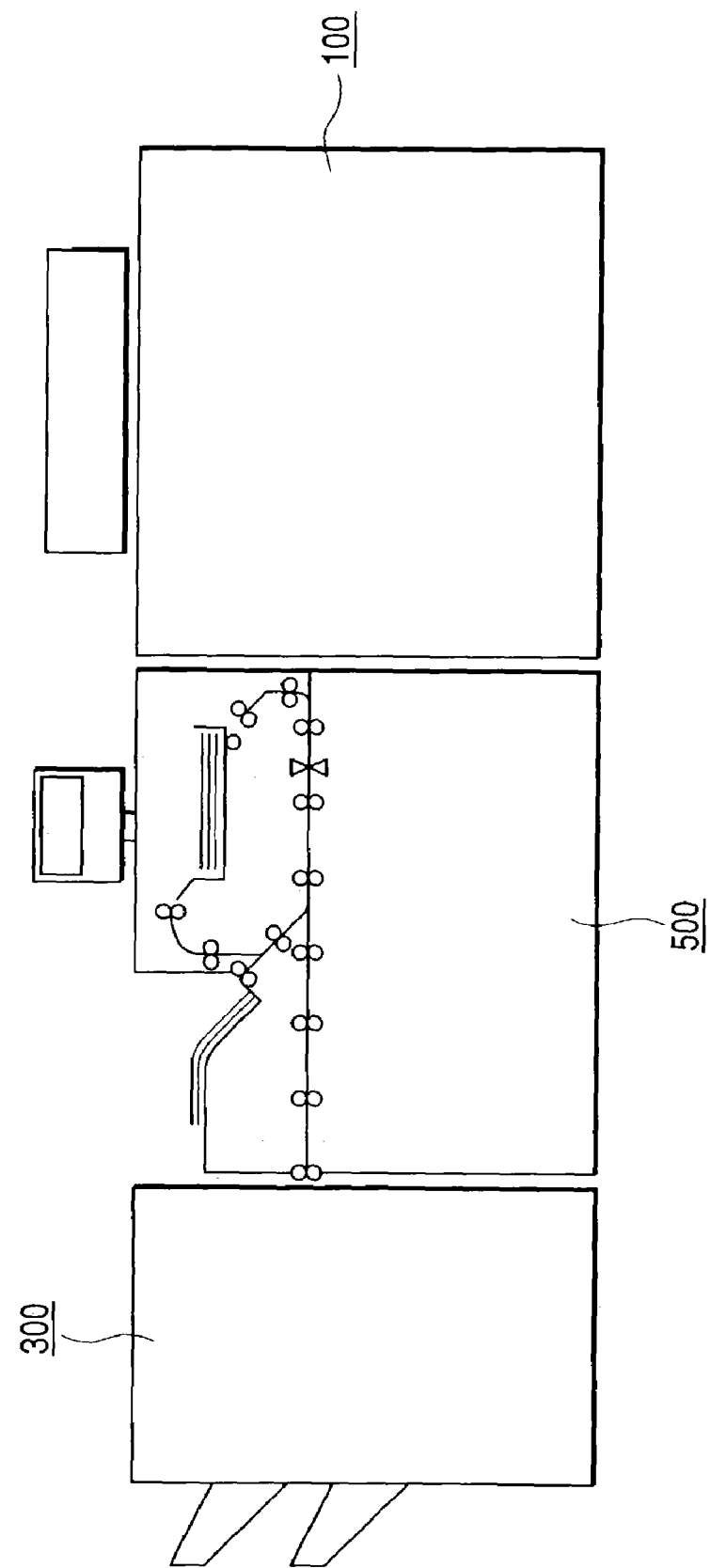
FIG. 2 is a schematic view of the whole of the inspection device.

Reference is now had to FIG. 1 to schematically describe the general construction of the inspection device 500 according to the embodiment of the present invention. The inspection device 500 has the function of detecting a faulty image on an output sheet due to the fault of the image forming apparatus 100, the skew feed of a sheet, the wrinkles or curled selvage of a sheet, faulty density or color misregister, the wrong color of a sheet due to erroneous sheet setting, etc.

The reference numeral 504 designates a transport path for receiving a sheet outputted from the image forming apparatus 100. The transport path 504 is connected to an exit for delivering the sheet to the post-treating device 300. The reference numeral 1007 denotes an output sheet reader for reading sheet information such as the image, color and configuration of the sheet. The output sheet reader 1007 is comprised of a CCD, a CIS or the like, and two such output sheet readers are disposed above and below the transport path 504 so as to read the two sides of the sheet. The reading width thereof is equal to or greater than the width of a maximum supplied sheet, and is a width sufficient to read even the configuration of the sheet. The reference numerals 506 and 507 designate flappers for changing over the transport direction of the sheet. The flapper 506 is for guiding the sheet to a branching-off path 513, and is disposed at a location distant by at least the length of the maximum supplied sheet from the output sheet reader 1007.

The reference numerals 502 and 505 denote trays for stacking thereon sheets guided by the flappers 506 and 507, respectively. The buffer tray 502 is provided with a re-feeding portion 503. Sheets are guided to the buffer tray 502 by a transport path 508. The tray 502 and the transport path are disposed so that the sheet re-fed from the tray 502 may again pass the output sheet readers 1007. An inspection tray 505 stacks thereon the sheets guided by a transport path 509, and is exposed to the outside of the inspection device 500. The reference numeral 1002 designates a storage device for storing therein image data read by the output sheet reader 1007, and is comprised of a hard disc or the like. The reference numeral 1000 denotes a comparator for comparing the read image with reference data, and the reference numeral 1001 designates a CPU which governs the operation of the inspection device 500 and the control of the image forming apparatus 100 and the post-treating device 300. The reference numeral 1009 denotes an operating portion utilized when indicating the state of the inspection device 500 and information necessary for an operator to be informed of, or effecting the indication of an operation which will be described later.

Figure 5:
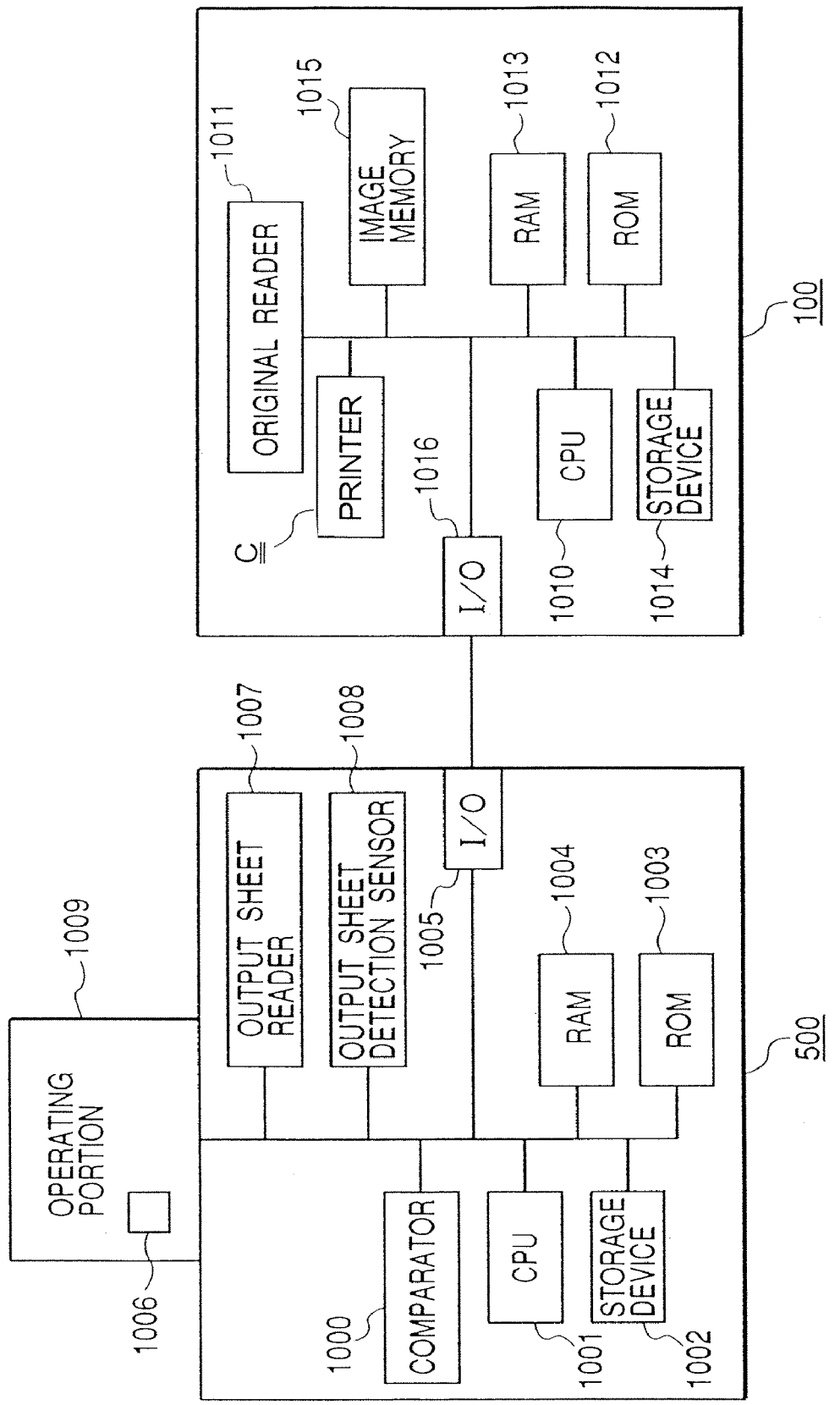
FIG. 5 is a block diagram showing an inspection device and an image forming apparatus in first and second embodiments.

FIG. 5 shows a block diagram of the inspection device 500 and the image forming apparatus 100. In the inspection device 500, the reference numerals 1000, 1001, 1002, 1007 and 1009 correspond to the aforedescribed comparator, CPU, storage device, output sheet reader and operating portion, respectively. The reference numeral 1003 designates a ROM for storing therein a program for operating the CPU 1001, the reference numeral 1004 denotes a RAM for supply a working area necessary for the CPU 1001 to operate, and the reference numeral 1005 designates an I/O for effecting serial communication with the image forming apparatus. The reference numeral 1006 denotes a confirmation switch for the operator to confirm the first sheet bundle, and informing that the operator has confirmed the absence of faulty sheets, and it is provided in the operating portion 1009. The reference numeral 1007 designates the aforedescribed output sheet reader, and not only inspection of images on output sheets, but also inspection in a form including a tab sheet, a cover, etc. as well is possible by the output sheet reader. The reference numeral 1008 denotes an output sheet detection sensor for detecting an output sheet from the image forming apparatus 100.

On the other hand, in the image forming apparatus 100, the reference numeral 1016 designates an I/O for effecting serial communication with the inspection device 500. The reference numeral 1010 denotes a CPU for effecting the sequence control and data handling of the entire image forming apparatus 100, and the reference numeral 1011 designates an original reader for reading an original to be copied and transforming it into electronic data. The reference numeral 1012 denotes a ROM for storing therein a program for operating the CPU 1010, the reference numeral 1013 designates a RAM for providing a working area necessary for the CPU 1010 to operate, and the reference numeral 1014 denotes a storage device comprised of a hard disc or the like to store therein the image data of the original read by the original reader 1011. The reference numeral 1015 designates an image memory for evolving an image to form the image data of the original read and transformed into the electronic data by the original reader 1011 as an image on the sheet.

First Embodiment

Figure 6:
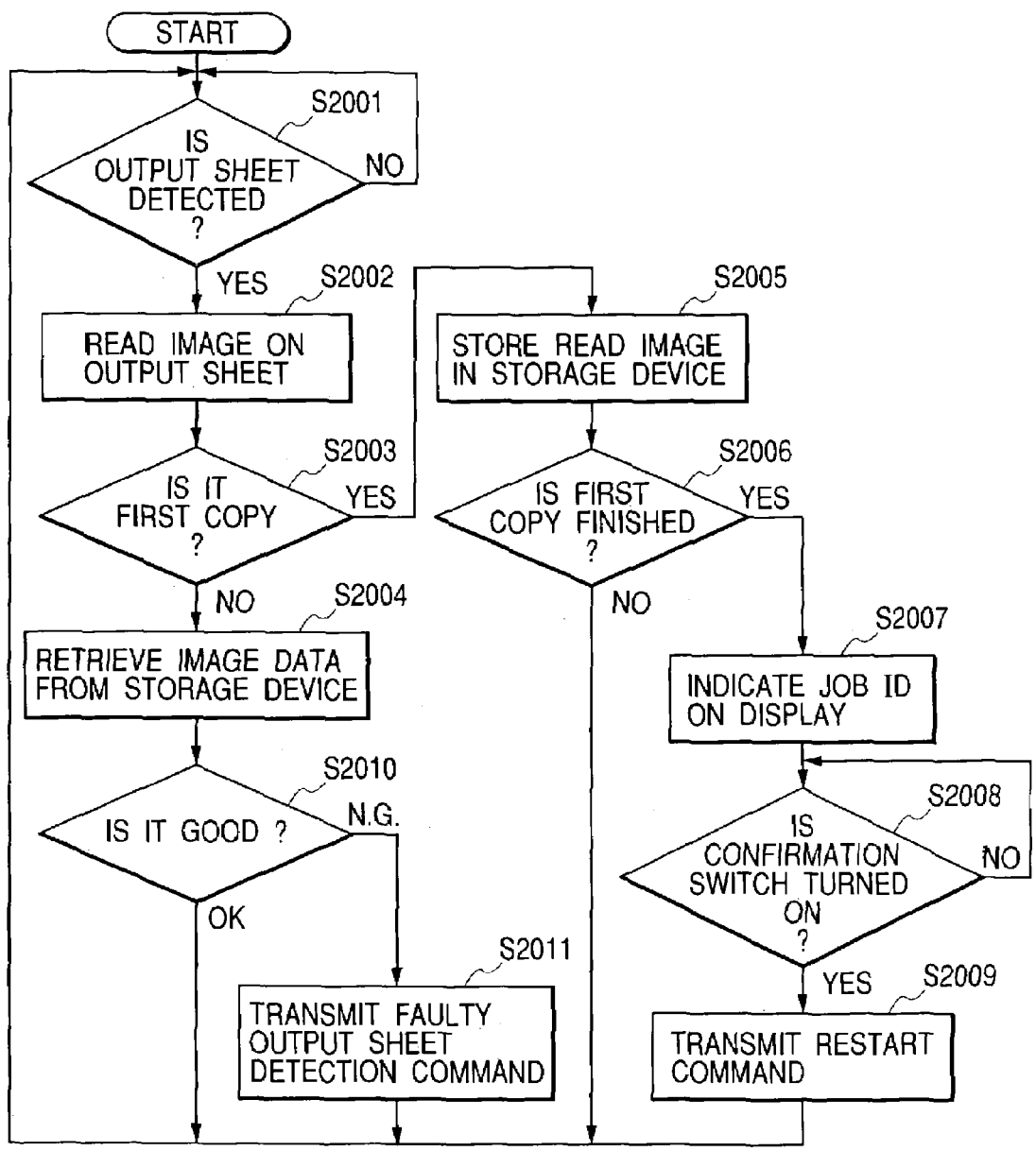
FIG. 6 is a flow chart representing the operation of the inspection device in the first embodiment.
Figure 7A:
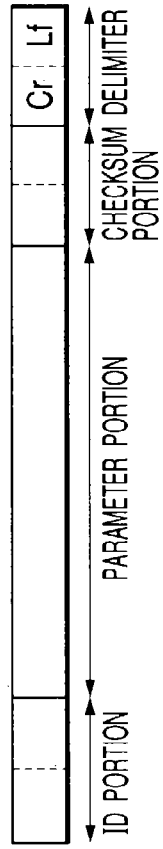
FIGS. 7A, 7B, 7C and 7D show examples of a command between the inspection device and the image forming apparatus.
Figure 7B:
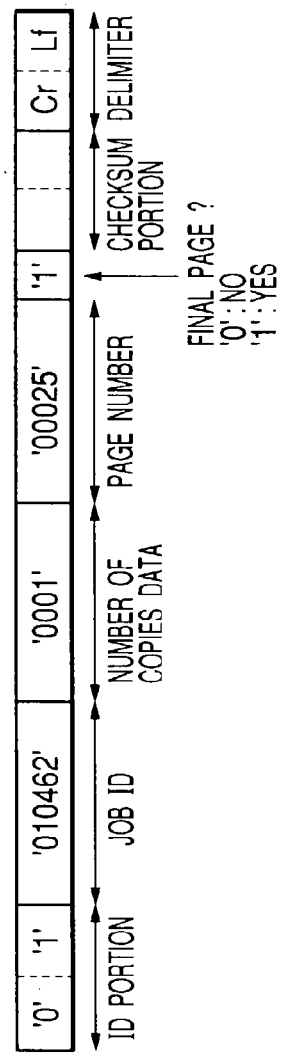
Figure 7C:
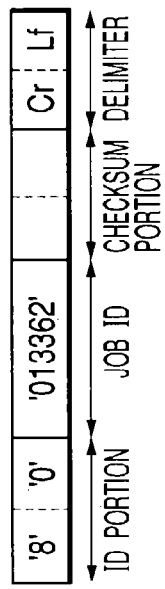
Figure 7D:
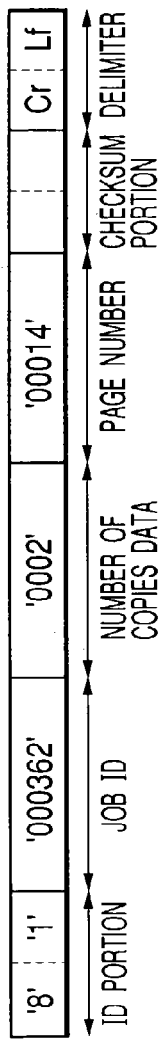

FIG. 6 is a flow-chart showing the series of operations of the inspection device 500 in a first embodiment. These series of operations are executed by the CPU 1001 in the inspection device 500. First, S2001 is a portion waiting for the inputting of an output sheet from the image forming apparatus 100. The detection of this input is effected by the output sheet detection sensor 1008 in the inspection device 500. S2002 is the process of reading and transforming the output sheet inputted from the image forming apparatus 100 into electronic data by the output sheet reader 1007 in the inspection device 500. As will be described later with reference to FIGS. 7, 7A, 7B, 7C and 7D, the image forming apparatus 100 transmits job ID, number of copies data and page number data to the inspection device 500 in synchronism with sheet delivery. S2003 is the process of judging whether the number of copies data transmitted from the image forming apparatus 100 by the serial communication indicates the first copy. If it is the first copy at the process of S2005, the received page number data and job ID are added to the image data read by the output sheet reader 1007 and are stored in the storage device 1002 in the inspection device 500. Thereafter, at S2006, whether the delivery of the first copy has been finished is judged from the final page information in the serial communication data from the image forming apparatus 100. If the first copy is finished, the image forming apparatus 100 side does not effect the treatment of the second and subsequent copies, but stands by in a waiting state. At S2007, the indication of the job ID is effected on the operating portion 1009, and the operator checks up the output sheets on the inspection tray 505. If the operator judges that there is no faulty sheet, at S2008, the image forming apparatus waits for the inputting of the corresponding job ID and for a restart command to be inputted by the operator by the use of a switch on the inspection device 500, and if these are inputted, at S2009, the restart command is transmitted to the image forming apparatus 100 by serial communication to thereby start the treatment of the second and subsequent copies.

Turning back to the description of S2003, if it is not the first copy, shift is made to S2004, where image data having page number data and job ID corresponding to the sheet outputted from the image forming apparatus 100 is retrieved from the storage device 1002. At S2010, the image data obtained by the output sheet reader 1007 and the image data retrieved from the storage device 1002 are compared with each other between corresponding pages to thereby judge whether the output sheet is good or not. If the output sheet is judged to be normal, shift is made to the waiting for the inputting of the next output sheet, and if the output sheet is judged to be abnormal, at S2011, a faulty output sheet detection command is transmitted to the image forming apparatus 100 by serial communication to thereby stop the printing operation. What has been described above is the basic operation sequence of the present inspection device 500.

The image forming apparatus 100 may continuedly output if there are unoutputted sheets in other copy job after the completion of the outputting of the first copy. Even in that case, the inspection device 500 can distinguish between jobs by the job ID in a sheet delivery command and can therefore execute continuous treatment.

Figure 9:
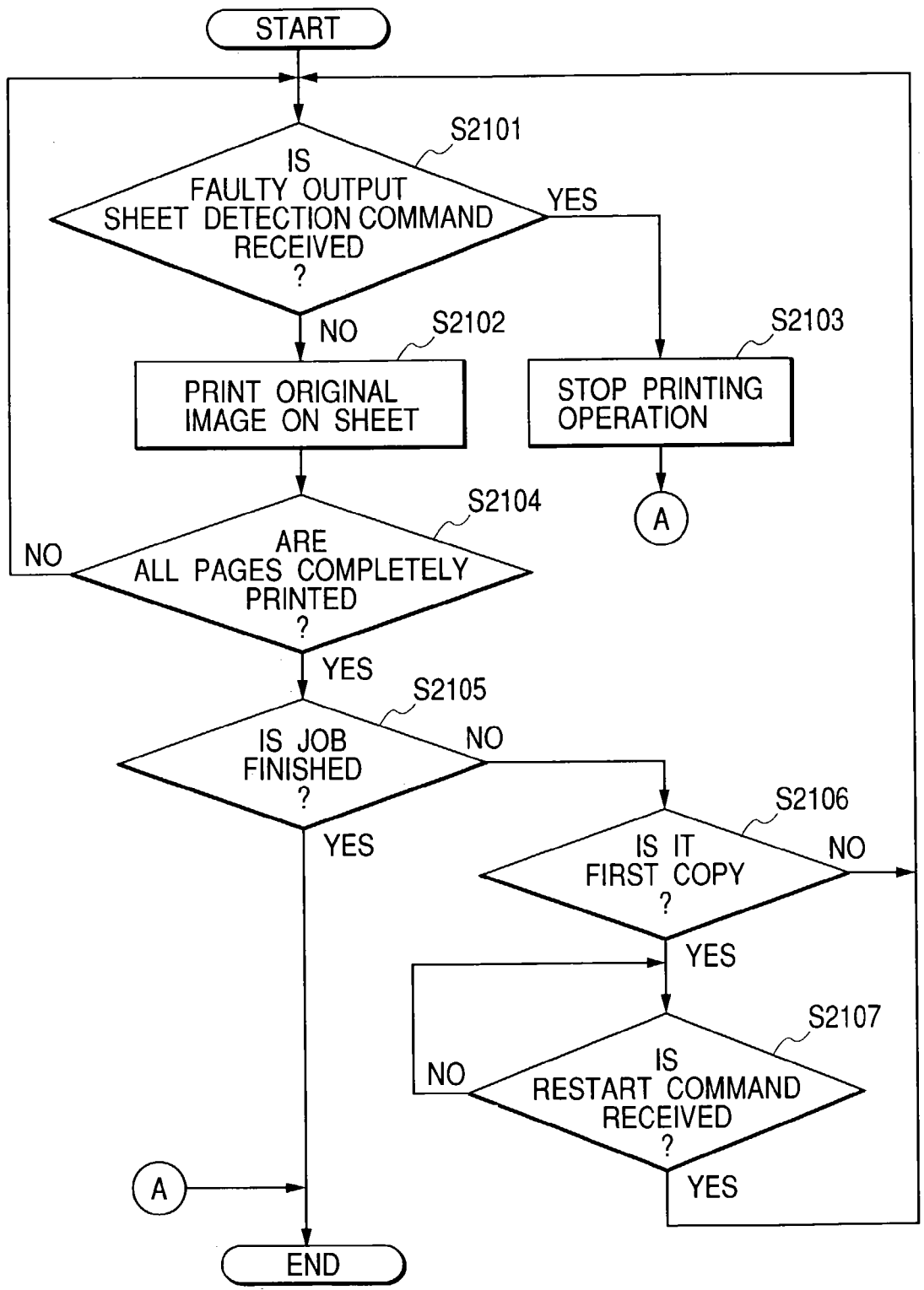
FIG. 9 is a flow chart representing the operation of the image forming apparatus in the first embodiment.

FIG. 9 is a flow chart showing the series of image forming operations of the image forming apparatus 100 in the first embodiment. These series of operations are executed by the CPU 1010 in the image forming apparatus 100. First, at S2101, whether the faulty output sheet detection command transmitted at S2011 has been received is judged. If the faulty output sheet detection command is not received, at S2102, the image of the original is printed on the sheet. If at S2101, the faulty output sheet detection command is received, at S2103, the printing operation is stopped, thus terminating the flow.

When at S2102, the image of the original is printed, whether all of the first page to the final page have been printed is judged. If the printing of all the pages has been completed, shift is made to S2105 for judging whether the job has been finished, and if all the pages have not been printed, return is made to S2101. When at S2105, it is judged that the job has been finished, the flow is terminated, and if the job is not finished, shift is made to S2106. At S2106, whether the sheet printed lastly is the first copy is judged, and if it is the first copy sheet, the image forming apparatus waits until at S2107, it receives the restart command transmitted from the inspection device 500 at S2009. If at S2106, it is judged that the sheet printed lastly is not the first copy, or if at S2107, the restart command is received, return is made to S2101.

FIGS. 7A, 7B, 7C and 7D show examples of a command for effecting serial communication between the inspection device 500 and the image forming apparatus 100. The reference numeral 3001 designates the basic format of the command. Each datum of the command is comprised of an ASCII code, and the first two bytes are an ID portion and represent the kind of the command and the communication direction. A command in which ID is 00-7F is transmitted from the image forming apparatus 100 to the inspection device 500, and a command in which ID is 80-FF is transmitted from the inspection device 500 to the image forming apparatus 100. The next parameter portion is an area in which, if it is necessary to further add information about each command, the information is transformed into ASCII data and is stored. A checksum portion is information added to detect any communication error, and is a value added from the head of the command to a byte unit and transformed into ASCII. The same calculation is effected on the side which has received the command, and if the result of the calculation is the same as the received checksum value, it is judged that no communication error has occurred. The next Cr and Lf are delimiters, and are data representative of the terminal of the command.

What has been described above is the construction of the basic format, and each example of the command will now be shown. The reference numeral 3002 denotes a sheet delivery command for representing the information of a delivered output sheet, and it is transmitted from the image forming apparatus 100 to the inspection device 500 in synchronism with the output sheet. The ID of the command is 01. Subsequently, in the parameter portion, there are stored a job ID having a unique value allotted to each copy job to distinguish between respective copy jobs, number of copies data representative of the copy number in the copy job, a page number representative of a page in the number of copies, and data representative of whether it is the final page. The reference numeral 3003 designates a restart command which is transmitted with a corresponding job ID added thereto by the confirmation switch 1006 on the operating portion 1009 being depressed after the delivery of the first copy has been completed. The image forming apparatus 100, if it receives this command, effects the outputting of the second and subsequent copies in a job designated by the job ID. The reference numeral 3004 denotes a faulty output sheet detection command which is transmitted to the image forming apparatus 100 when the inspection device 500 detects a faulty sheet. The image forming apparatus 100, if it receives this command, immediately stops the image forming operation and informs the operator of it.

Figure 8B:
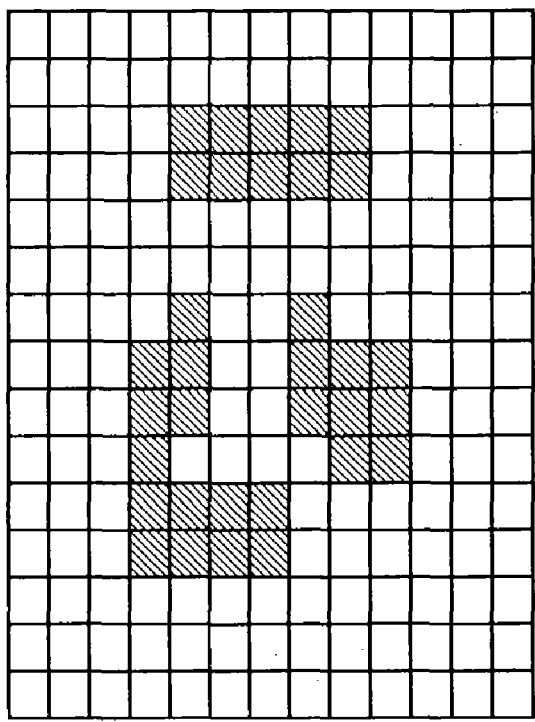
FIGS. 8A and 8B represent image data in the inspection device of the present invention.
Figure 8A:
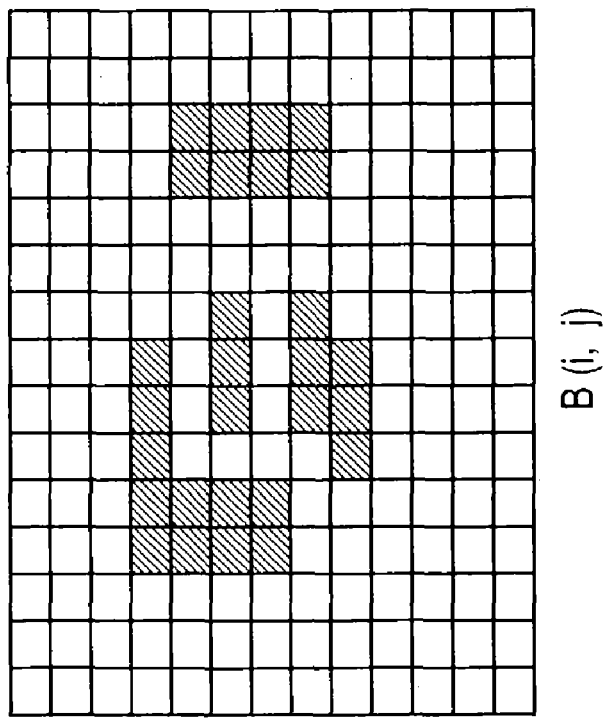

Next, in the case of the second and subsequent copies, the calculation of the degree of similarity between the image data read by the output sheet reader 1007 of the inspection device 500 and the image data stored in the storage device in the inspection device 500 is effected. Various methods of calculating this degree of similarity are conceivable, and an example thereof will be described here. FIG. 8A represents the pattern of the image data read by the output sheet reader 1007 of the inspection device 500 in the present embodiment, and FIG. 8B represents the pattern of the image data stored in the storage device, and the respective patterns are referred to as $B(i,j)$ and $P(i,j)$. $B(i,j)$ and $P(i,j)$ assume a value of "1" in the case of a black pixel, and assume a value of "0" in the case of a white pixel. Also, assuming that the centroidal coordinates of $B(i,j)$ and $P(i,j)$ are $(iBc, jBc)$ and $(iPc, jPc)$, respectively, the degree of similarity COR between the two is represented by the following expression:

$$COR = \sum_i \sum_j P(i-ipc, j-jpc) \text{ xor } B(i-ibc, j-jbc)$$

where xor represents the exclusive logical sum of P and B.

The above expression shows the Hamming distance when the centroids of the pattern B(i,j) and the pattern P(i,j) are arranged properly. Also, the greater is the value of COR, the greater becomes the degree of similarity between the two. When the degree of similarity COR is calculated by the above-mentioned calculation, comparison between a preset threshold value Th and COR is effected. That is, when COR>Th, the read image data is substantially the same as the image data in the storage device, and the output sheet is judged to be good. Also, when COR<Th, the degree of similarity between the two image data is low, and the output sheet is judged to be faulty. By changing the threshold value Th, it is possible to change the accuracy of judgment. Also, by changing the threshold value Th in conformity with the kind of the image data to be inspected, it is possible to provide a more flexible inspecting function.

Thus, according to the first embodiment, the user simply visually inspect the image of the first copy read by the output sheet reader 1007, whereby the visual inspection of the second and subsequent sheets becomes unnecessary. Also, the user can detect any faulty sheet at a standard approximate to a standard at which the user judges an output sheet to be a faulty sheet.

Second Embodiment

Figure 10:
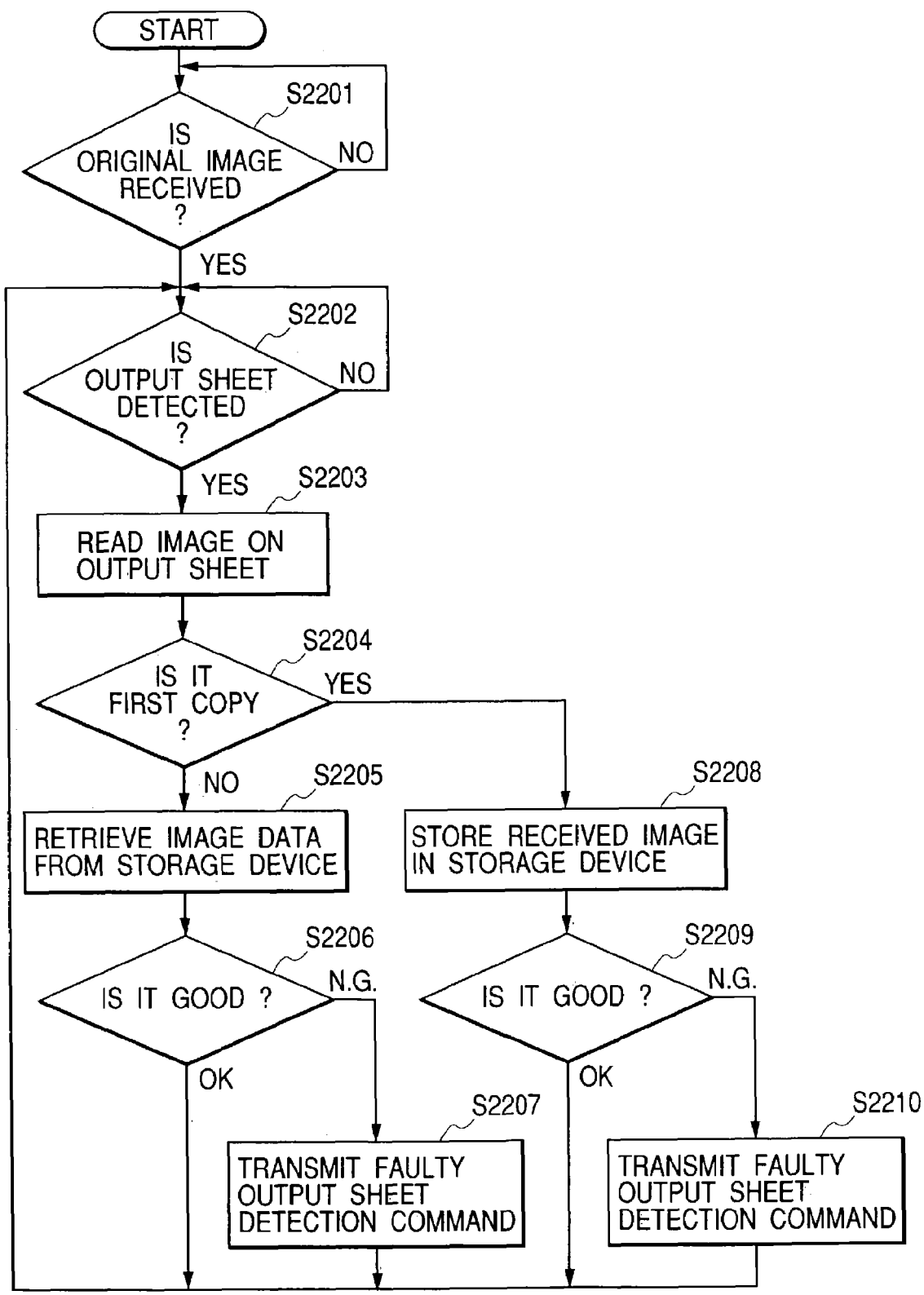
FIG. 10 is a flow chart representing the operation of the inspection device in the second embodiment.

The control of the inspection device 500 in a second embodiment will now be described with reference to FIG. 10. FIG. 10 is a flow chart when after the outputting of the first copy, the user does not depress the confirmation switch, but an original image read by the original reader 1011 is stored in the storage device 1002 provided in the inspection device 500, and output sheet image data read by the output sheet reader 1007 and the original image data stored in the storage device 1002 are compared with each other to thereby realize an automatic inspecting operation. In this embodiment, even if the user himself does not perform the inspecting operation, the automatic inspecting operation can be realized, and only the original image data of the first copy is transmitted from the image forming apparatus 100 to the inspecting device 500 and is stored in the storage device 1002, and the communication of original image data is not effected for the second and subsequent copies, but the image data stored in the storage device 1002 is used, and this leads to the effect of reducing the communication data amount between the image forming apparatus 100 and the inspecting device 500. These series of controlling operations are executed by the CPU 1001 in the inspecting device 500.

At S2201, the inspection device 500 waits until it receives the original image data read by the original reader 1011. However, in the case of the second and subsequent copies, original image data are not transmitted to the inspection device. When at S2201, the original image data is received, shift is made to S2202, where the inspection device waits until it detects an output sheet from the image forming apparatus 100. The detection of the inputting of the output sheet is effected by the output sheet detection sensor 1008 in the inspecting device 500. S2203 is the process of reading and transforming the output sheet inputted from the image forming apparatus 100 by the output sheet reader 1007 in the inspection device 500 into electronic data. At this time, as described in connection with FIG. 7B, the image forming apparatus transmits number of copies data and page number data to the inspection device by serial communication in synchronism with sheet delivery.

S2204 is the process of judging whether the number of copies data transmitted from the image forming apparatus 100 by serial communication indicates the first copy. If it is the first copy, the received page number data is added to the original image data received at the process of S2208, and is stored in the storage device 1002 in the inspection device 500, whereafter shift is made to S2209. At S2209, the original image data received from the image forming apparatus 100 and the output sheet image data read by the output sheet reader 1007 are compared with each other to thereby judge whether the output sheet is good or faulty. If the output sheet is judged to be normal, shift is made to S2202, where the inputting of the next output sheet is waited for, and if the output sheet is judged to be abnormal, at S2110, a faulty output sheet detection command is transmitted to the image forming apparatus 100 by serial communication to thereby stop the copying operation.

Turning back to the description of S2204, if the output sheet is not the first copy, shift is made to S2205, where image data having page number data corresponding to the sheet outputted from the image forming apparatus 100 is retrieved from the storage device 1002. At S2206, the output sheet image data obtained by the output sheet reader 1007 and the original image data retrieved from the storage device are compared with each other between corresponding pages to thereby judge whether the output sheet is good or faulty. If the output sheet is judged to be normal, sheet is made to S2202, where the inputting of tee next output sheet is waited for, and if the output sheet is judged to be abnormal, at S2207, a faulty output sheet detection command is transmitted to the image forming apparatus 100 by serial communication to thereby stop the copying operation.

Figure 11:
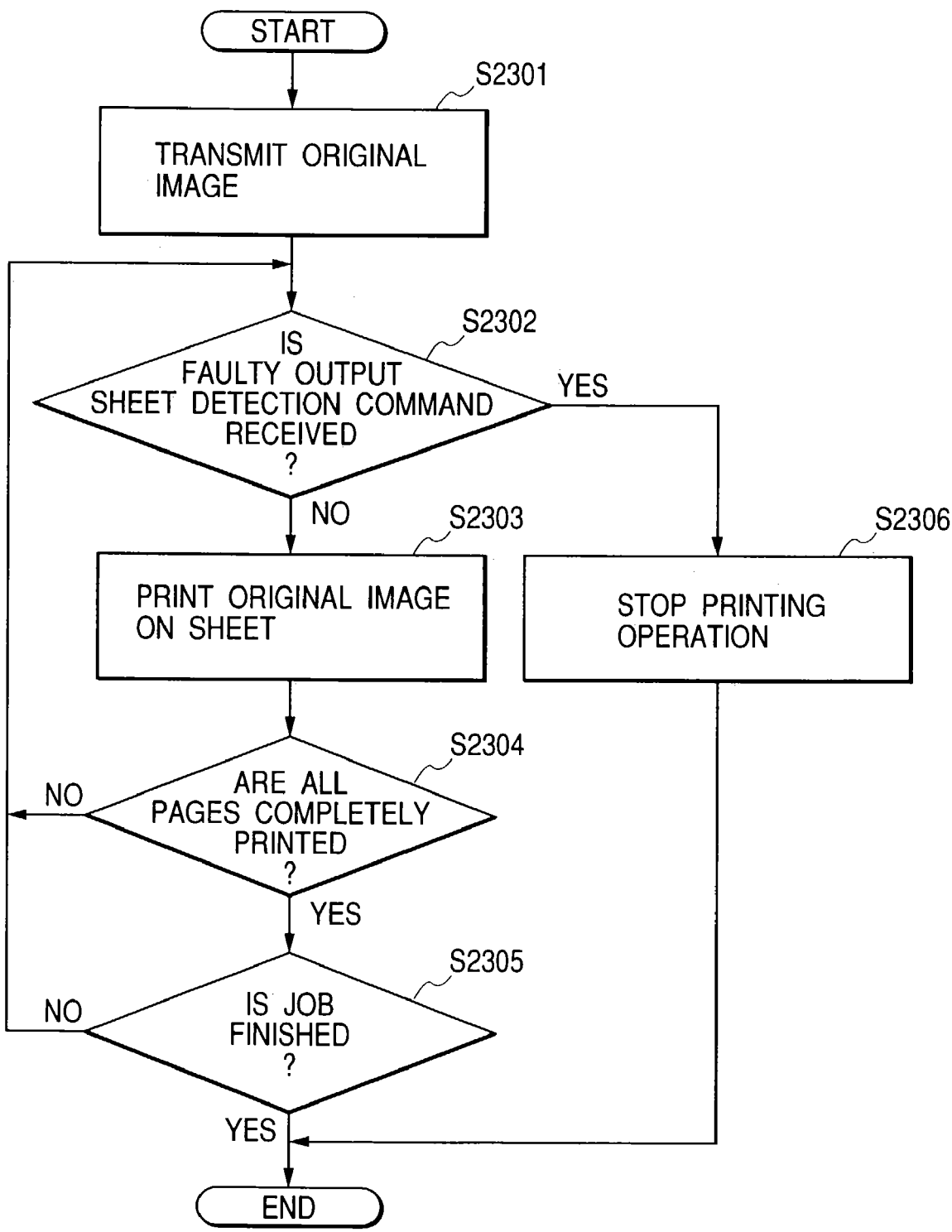
FIG. 11 is a flow chart representing the operation of the image forming apparatus in the second embodiment.

FIG. 11 is a flow chart showing the series of image forming operations of the image forming apparatus 100 in the second embodiment. These series of operations are executed by the CPU 1010 in the image forming apparatus 100. First, at S2301, an original image read by the original reader 1011 is transmitted to the inspection device 500. The transmitted original image data is received at the aforedescribed S2201. At S2302, whether the faulty output sheet detection command transmitted at S2207 or S2210 has been received is judged. If the faulty output sheet detection command is not received, at S2303, the original image is printed on the sheet. If at S2302, the faulty output sheet detection command is received, at S2306, the printing operation is stopped, thus terminating the flow.

When at S2303, the original image is printed, at S2304, whether all of the first page to the final page have been printed is judged. If the printing of all the pages has been completed, shift is made to S2305 for judging whether a job has been finished, and if all the pages have not been printed, return is made to S2302. When at S2305, it is judged that the job has been finished, the flow is terminated, and if the job is not finished, shift is made to S2302.

Thus, in the second embodiment, an automatic inspecting operation can be realized even if the user himself does not perform the inspecting operation, and only the original image data of the first copy is transmitted from the image forming apparatus 100 to the inspection device 500 and is stored in the storage device 1002, and the communication of original image data is not effected for the second and subsequent copies, but use is made of the image data stored in the storage device 1002 and therefore, the communication data amount between the image forming apparatus 100 and the inspection device 500 can be reduced.

Third Embodiment

Description will now be made of the inspecting operation in a third embodiment. While the aforedescribed first and second embodiments have been concerned with the inspecting operation when the image forming apparatus 100 is used as a copying machine, in the third embodiment, the inspecting operation is made possible when the image forming apparatus 100 is used as a printer connected to a network.

Figure 12:
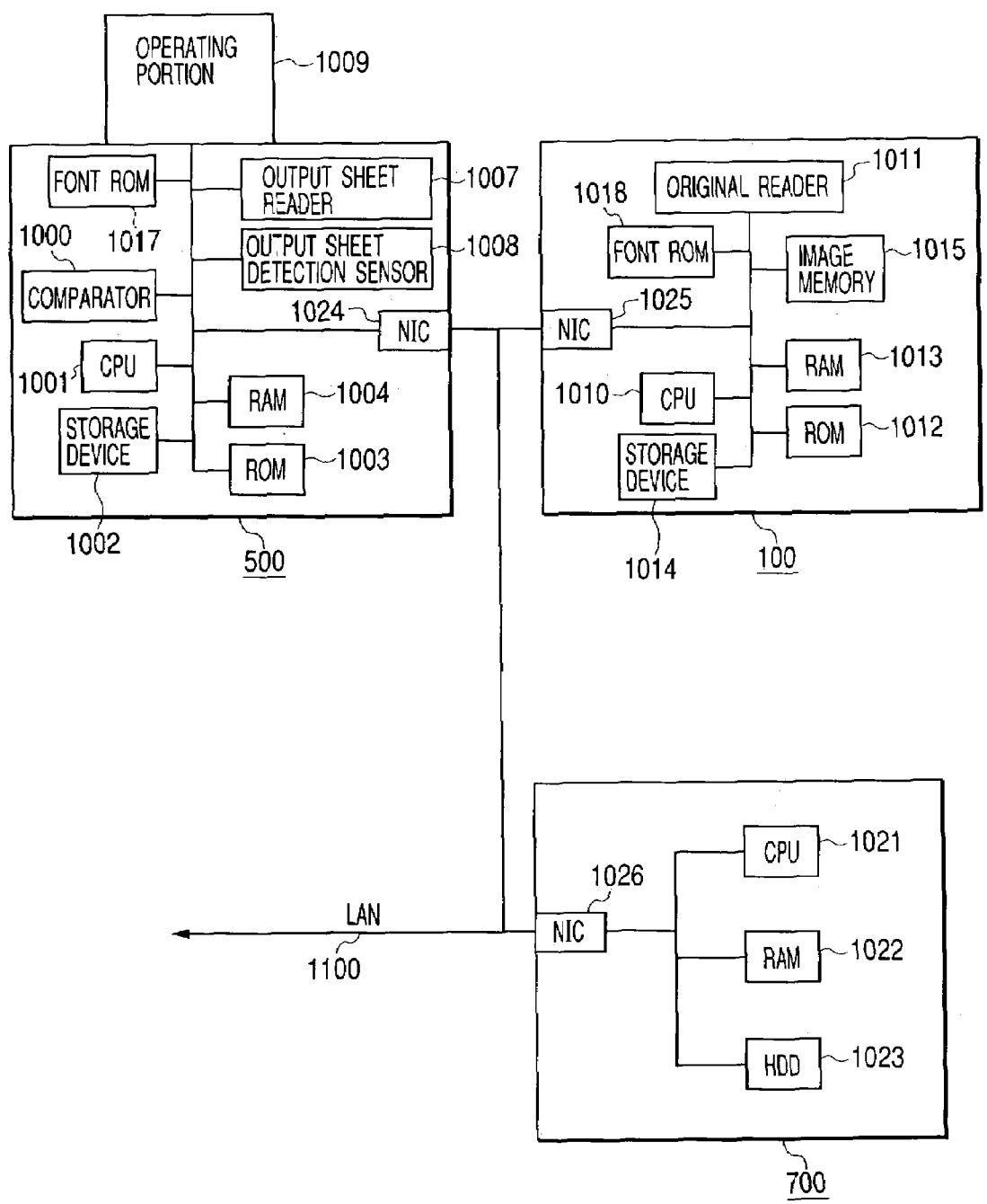
FIG. 12 is a block diagram showing an inspection device, an image forming apparatus and PC in a third embodiment.

FIG. 12 is a block diagram of the inspection device 500, the image forming apparatus 100 and a PC 700. The inspection device 500 in the present embodiment is the inspection device 500 shown in FIG. 5 which is additionally provided with NIC 1024 and a Font ROM 1017. The NIC 1024 effects the transmission and reception of data between it and the image forming apparatus 100 or the PC 700 via the network. The Font ROM 1017 is a Font ROM necessary to transform PostScript format code data transmitted from the PC 700 into Bit Map format data.

On the other hand, the image forming apparatus 100 is the image forming apparatus 100 shown in FIG. 5 which is additionally provided with NIC 1025 and a Font ROM 1018. The NIC 1025 effects the transmission and reception of data between it and the inspection device 500 or the PC 700 via the network. The Font ROM 1018 is a Font ROM necessary to transform PostScript format code data transmitted from the PC 700 into Bit Map format data.

Also, the PC 700 side is of a popular construction and can prepare and preserve documents. It effects the transmission and reception of data between it and the network via NIC 1026. The reference numeral 1021 designates a CPU effecting the calculation of data in the PC 700. The reference numeral 1022 denotes a RAM for temporarily holding data when the CPU 1021 effects calculation. The reference numeral 1023 designates a hard disc for storing therein data such as a document processed by the CPU 1021. Design is made such that the data stored in the hard disc is held even if the power source of the PC 700 is cut off.

The reference numeral 1100 denotes LAN to which the inspection device 500, the image forming apparatus 100 and the PC 700 are connected.

As the third embodiment of the present invention, consider one as shown in FIG. 12 wherein the image forming apparatus 100, the inspection device 500 and the PC 700 are connected together by the LAN 1100, and image data is transmitted to the inspection device 500 and the image forming apparatus 100 by a driver program executed by the PC 700. The image data transmitted to the image forming apparatus 100 is formed as an image on a sheet by the image forming apparatus 100. The image data transmitted to the inspection device 500 is stored in the storage device 500 is stored in the storage device 1002. The image forming apparatus 100 forms an image on the sheet and transports the sheet to the inspection device 500. At that time, information for discriminating the transported sheet is transmitted to the inspection device 500. The inspection device 500 reads the image on the sheet transported thereto from the image forming apparatus 100 by the output sheet reader 1007. Also, image data corresponding to the discriminating information received from the image forming apparatus 100 is read out from the storage device 1002, and is compared with the image read by the output sheet reader 1007 to thereby detect a faulty sheet. This control will hereinafter be described in detail.

Figure 13:
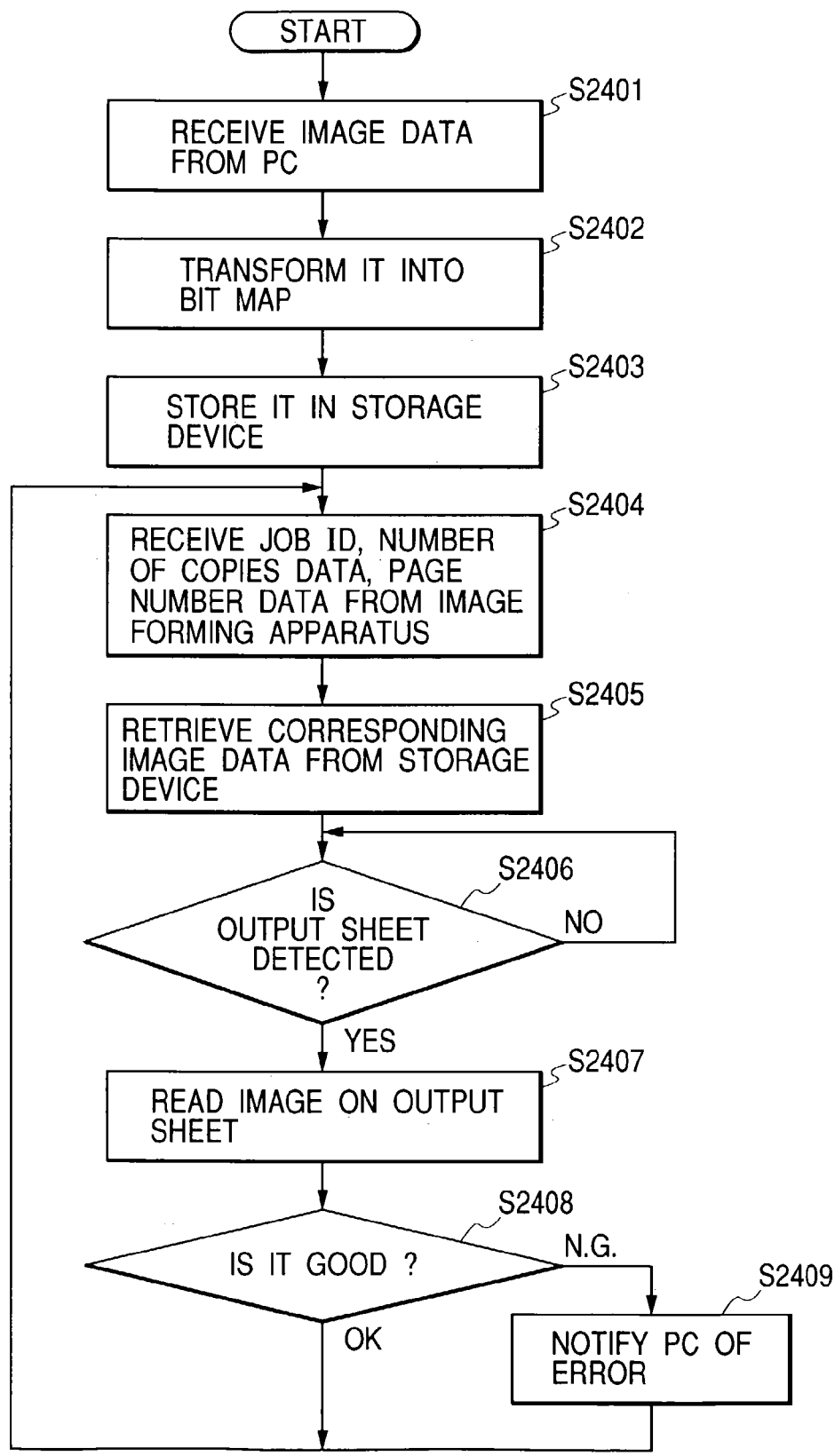
FIG. 13 is a flow chart representing the operation of the inspection device in the third embodiment.
Figure 14:
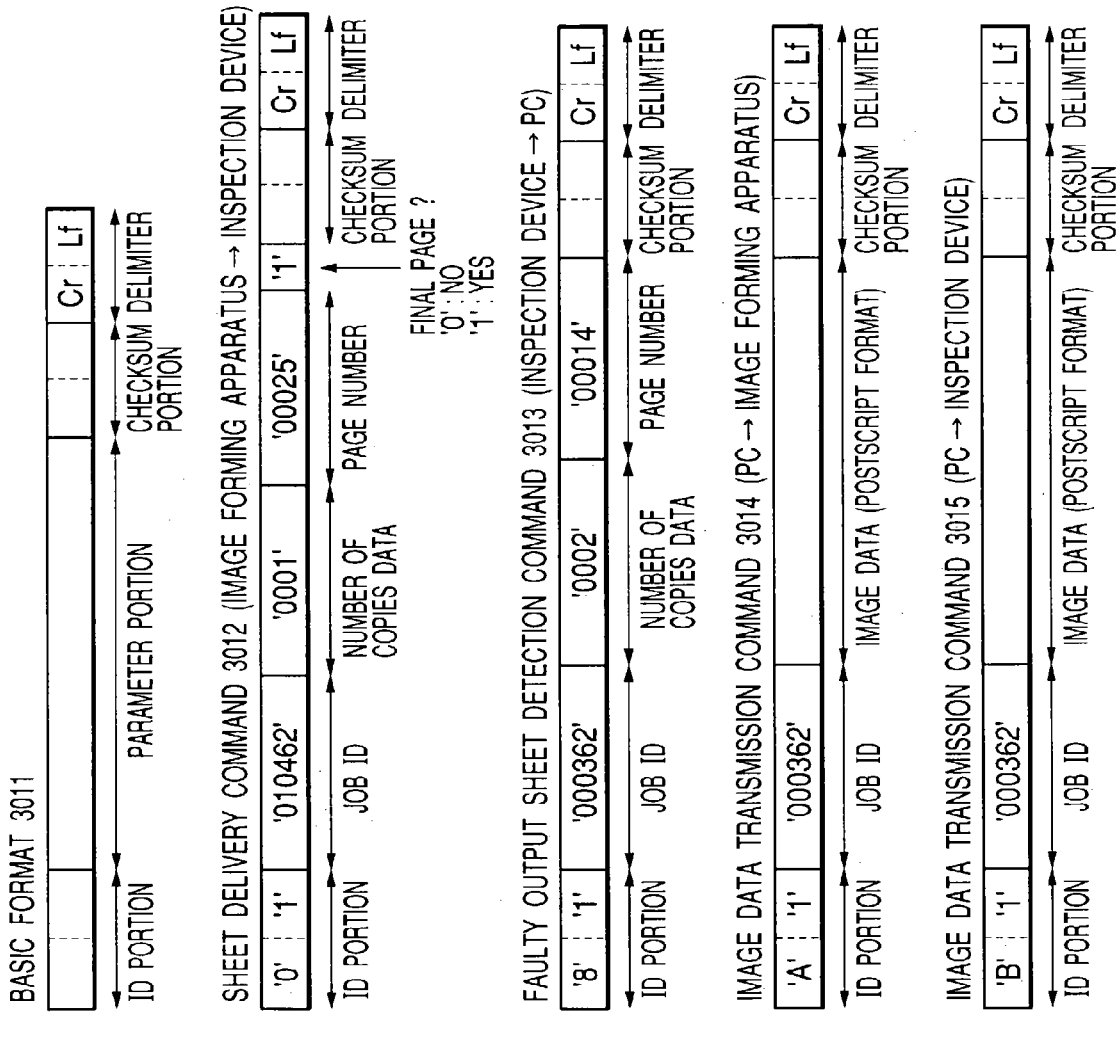
FIGS. 14A, 14B, 14C, 14D and 14E show examples of a command among the inspection device, the image forming apparatus and the PC.

FIG. 13 is a flow chart showing the series of inspecting operations of the inspection device 500. These series of operations are executed by the CPU 1001 in the inspection device 500.

First, the image data transmitted by the PC 700 is received (S2401). The received image data is transformed from the PostScript type into the Bit Map type (S2402). The image data transformed into the Bit Map format is stored in the storage device 1002 (S2403).

Next, job ID, number of copies data and page number data are received from the image forming apparatus 100 (S2404). The job ID is data added when the PC 700 transmits image data to the image forming apparatus 100 or the inspection device 500, and is for distinguishing between respective image data from the others. Thereafter, image data corresponding to the data received at S2404 is retrieved from the storage device 1002 (S2405).

Next, the inspection device waits until a sheet transported thereto from the image forming apparatus 100 is detected (S2406). The detection of this sheet is effected by the output sheet detection sensor 1008 in the inspection device 500. When at S2406, the sheet transported from the image forming apparatus 100 is detected, the image on the sheet is read by the output sheet reader 1007 in the inspection device 500 and is transformed into electronic data (S2407).

The image data retrieved from the storage device 1002 at S2405 and the image data read by the output sheet reader 1007 in the inspection device 500 and transformed into the electronic data are compared with each other by the comparator 1000 to thereby judge whether the output sheet is good or not (S2408). If the result of the judgment is O.K., return is made to S2404. If the result of the judgment is N.G., at S2409, the PC 700 is notified of an error via the network connected to the image forming apparatus 100. What has been described above is the basic operation sequence of the present inspection device 500.

FIGS. 14A, 14B, 14C, 14D and 14E show examples of a command for effecting communication between the inspection device 500 and the image forming apparatus 100 via the network. The reference numeral 3011 designates the basic format of the command. Each datum of the command is comprised of an ASCII code, and the first two bytes are an ID portion and represent the kind and communication direction of the command. The next parameter portion is an area which, if it is necessary to further add information about each command, transforms the information into ASCII data and stores it therein. A checksum portion is information added to detect any communication error, and is a value added from the head of the command to one byte unit and transformed into ASCII. The same calculation is effected on the side which has received the command, and if the result of the calculation is the same as the received checksum value, it is judged that no communication error has occurred. The next Cr and Lf are delimiters, and are data representative of the terminal of the command.

What has been described above is the construction of the basic format, and examples of respective commands will now be shown. The reference numeral 3012 designates a sheet delivery command for representing the information of a delivered sheet, and this sheet delivery command is transmitted from the image forming apparatus 100 to the inspection device 500 in synchronism with the sheet. The ID of the command is 01. Subsequently, a unique value is allotted to job ID for each print job in order to distinguish between respective print jobs. The job ID is data transmitted in addition to image data when the PC 700 asks the image forming apparatus 100 to print number of copies data representing how manieth copy in the print job the output sheet is, page number data representative of the page number in the number of copies, and data indicating whether the page is the final page are stored in the parameter portion. The reference numeral 3013 denotes a faulty output sheet detection command which is transmitted to the PC 700 when the inspection device 500 detects a faulty sheet. The reference numerals 3014 and 3015 designate commands transmitted when the PC 700 asks the image forming apparatus 100 to print, and asks the inspection device 100 to inspect the sheet, and these commands are comprised of job ID for distinguishing from other print data, and image data represented by a PostScript.

Figure 15:
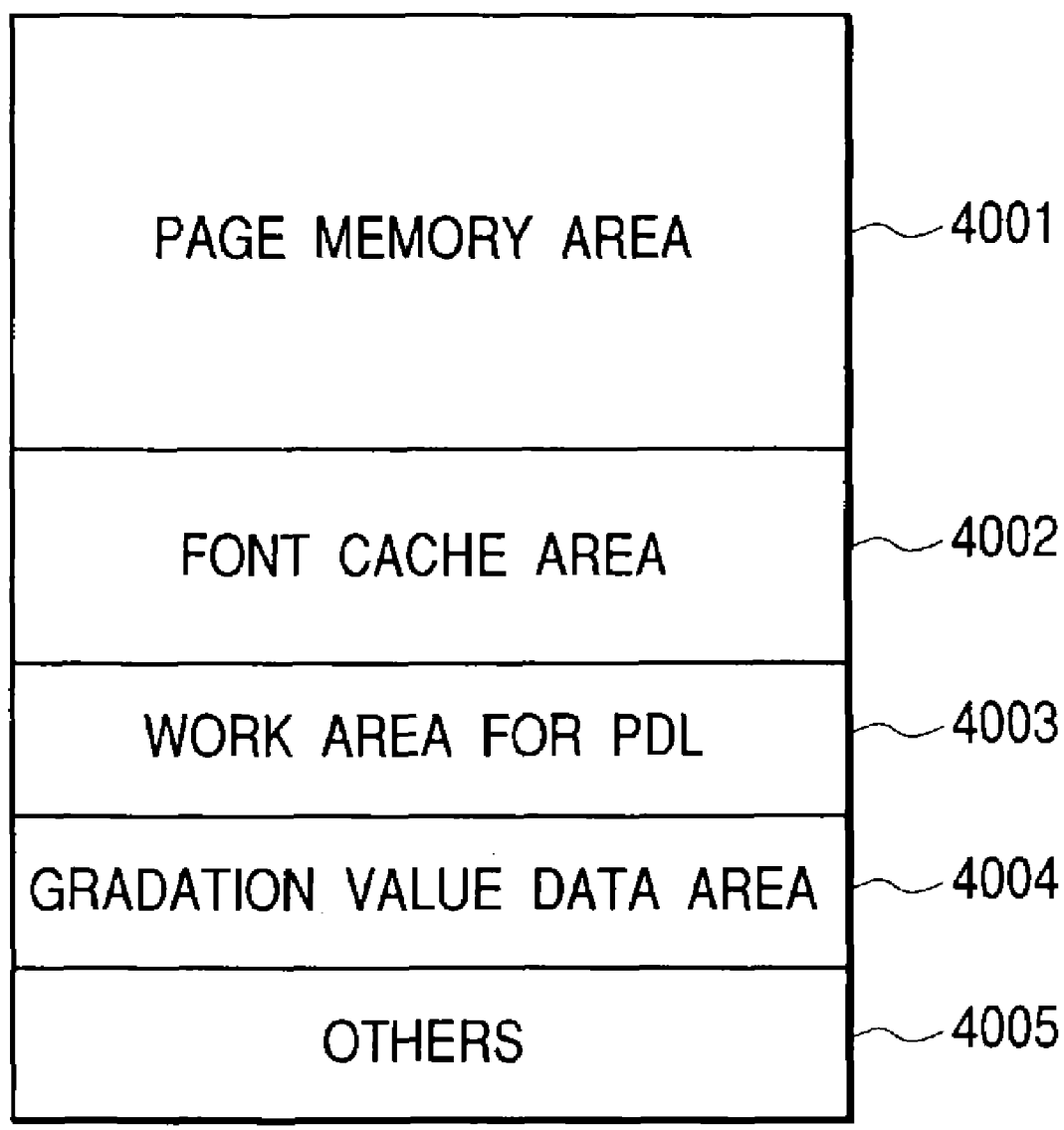
FIG. 15 shows an example of the construction of a RAM in the inspection device.

FIG. 15 shows the construction of a RAM in the inspection device 500. The RAM 1004 in the inspection device 500 of the present embodiment is comprised of a page memory area 4001 for storing therein Bit Map image data corresponding to one page, a font cache area 4002 for storing Bit Map image data therein when the outline font of a text character is evolved into the Bit Map image data, a work area 4003 for PDL allotted to process a page-description language such as PostScript, and other auxiliary area 4005. In the work area 4003 for PDL or other auxiliary area 4005, there is a gradation value data area 4004 for storing therein a gradation value referred to when cache data in the font cache area 4002 is converted into multi-value data.

Figure 16:
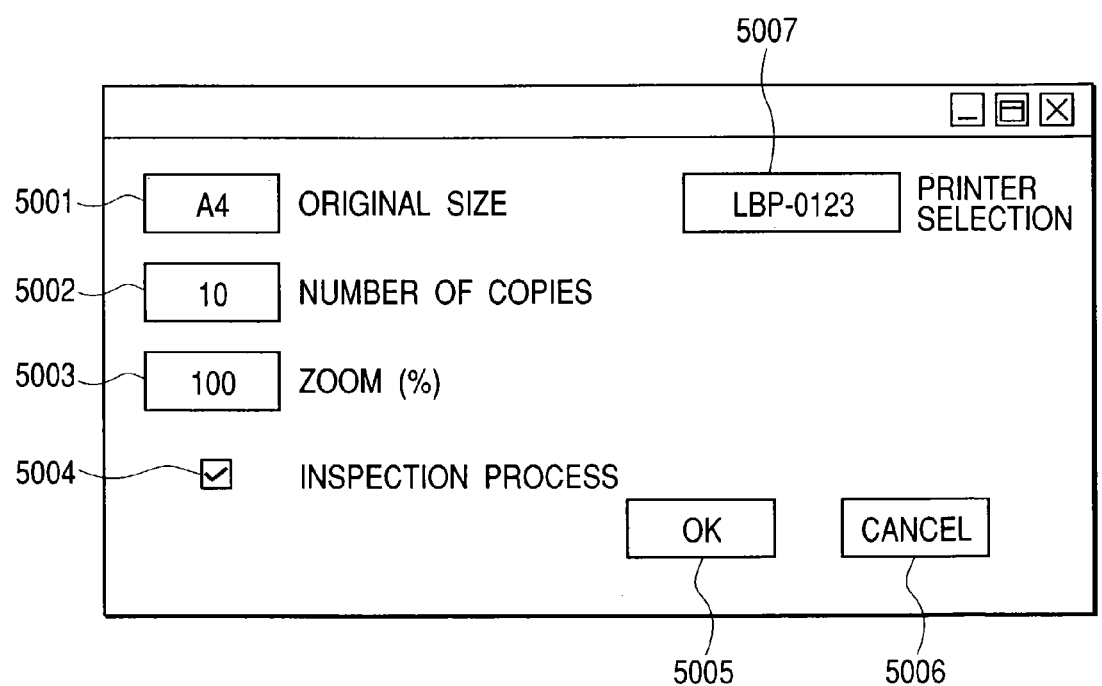
FIG. 16 shows an example of a dialog box indicated when the printing of a document is executed from the PC.

FIG. 16 shows a dialog box indicated when the printing of a document is executed from the PC 700. The reference numeral 5001 designates a text box for designating the size of an original. The reference numeral 5002 denotes a text box for designating the number of copies to be printed. The reference numeral 5003 designates a text box for designating the magnification during printing. The reference numeral 5004 denotes a check box for checking up whether the inspecting process should be carried out or not, and if it is checked up, an inspection process is executed. The reference numeral 5005 designates a button for starting printing. The reference numeral 5006 denotes a button for cancelling printing. The reference numeral 5007 designates a list box for selecting a printer to be used for printing from among printers connected to the network.

Figure 17:
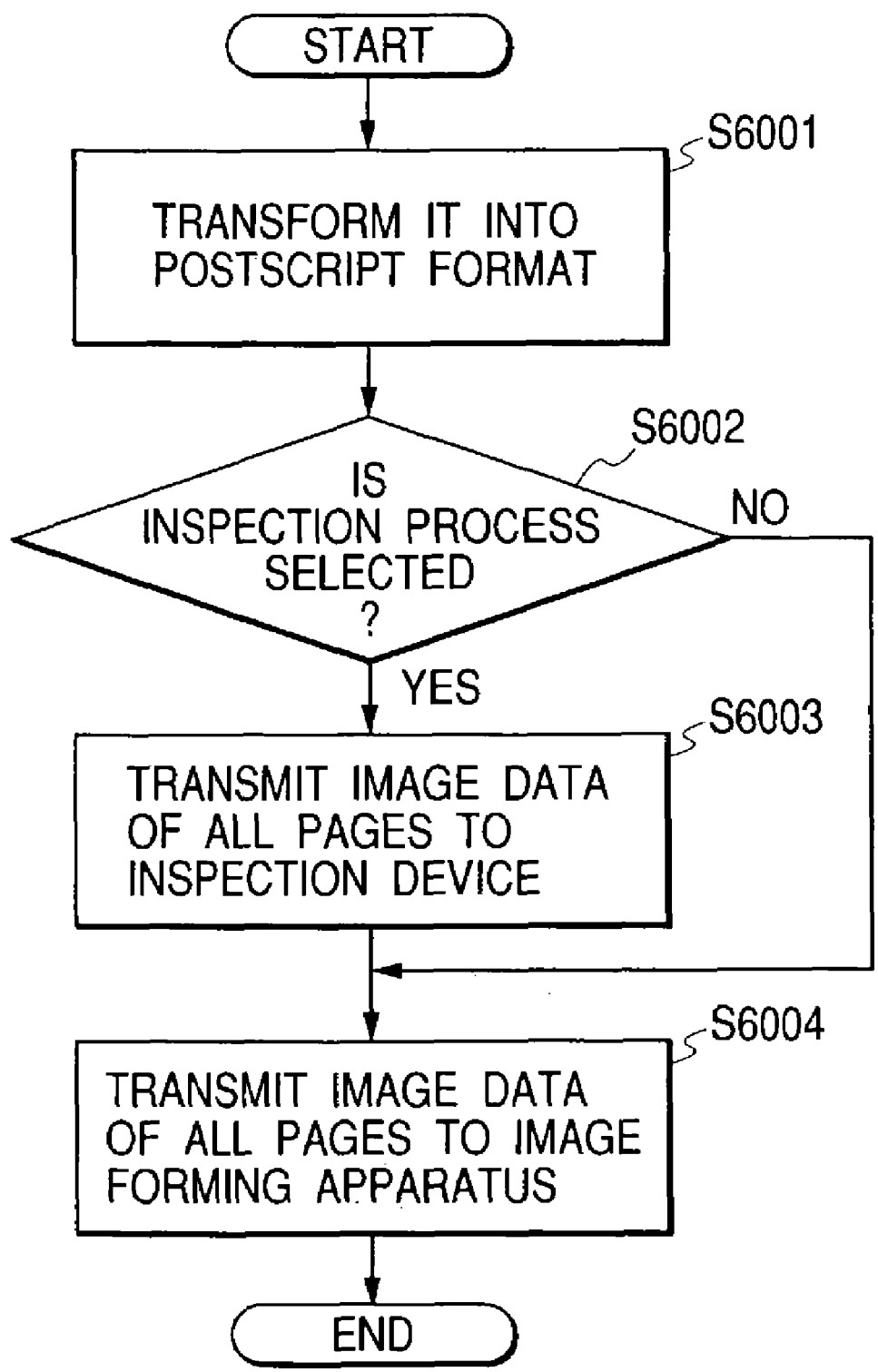
FIG. 17 is a flow chart of a printer driver in the third embodiment for executing the printing from the PC.

FIG. 17 is a flow chart of a printer driver for executing printing by the PC 700. A driver program for executing this flow chart is stored in the hard disc 1023, and is executed by the CPU 1021 in the PC 700.

When the O.K. button 5005 in FIG. 16 is depressed, the execution of a printing task is started. First, a data format inherent to application is transformed into a generally used PostScript format by the printer (S6001). Next, whether the "inspection process" is selected or not is judged by the check box 5004 (S6002).

If at S6002, the "inspection process" is selected, the image data of all pages are transmitted to the inspection device 500 (S6003) and next, the image data of all pages are transmitted to the image forming apparatus 100 (S6004).

Here, it is for completing the image transforming process (S2402 in FIG. 13) from the PostScript format into the Bit Map format in the inspection device 500 earlier than in the image forming apparatus 100 that the image data are transmitted to the inspection device 500 earlier than to the image forming apparatus 100. That is, the image data are transmitted to the inspection device 500 earlier than to the image forming apparatus 100 and therefore, the image transforming process in the inspection device 500 is started earlier than in the image forming apparatus 100. The inspection device 500 and the image forming apparatus 100 transform the same image data and thus, the inspection device 500 which has started the transformation earlier completes the transforming process earlier. Thereby, when a sheet on which an image conforming to the image data has been formed has been transported from the image forming apparatus 100 to the inspection device 500, it can be prevented that a faulty sheet cannot be detected because the image transforming process is not completed in the inspection device 500.

Also, if at S6002, the inspection process is not selected, the image data of all pages are transmitted to the image forming apparatus 100 (S6004). When the above-described process is finished, the printing task is finished.

Figure 18:
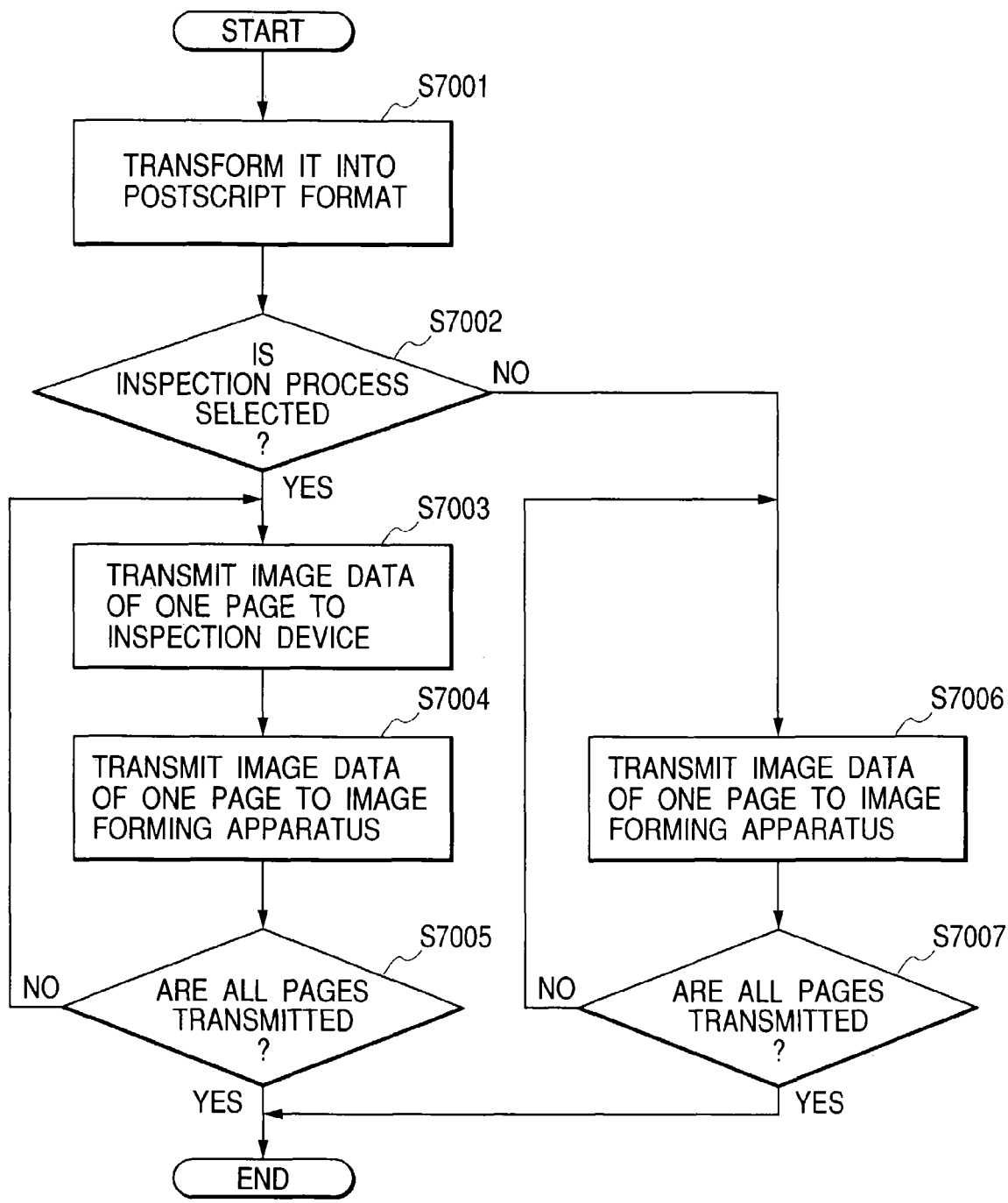
FIG. 18 is a flow chart of the printer driver in the third embodiment for executing the printing from the PC.

While in FIG. 17, the image data of all pages are transmitted at a time, as shown in FIG. 18, the image data of one page unit may be transmitted to the image forming apparatus 100 and the inspection device 500. The flow chart of FIG. 18 will hereinafter be described.

When the O.K. button 5005 of FIG. 16 is depressed, the execution of the printing task is started. First, the data format inherent to application is transformed into the PostScript format generally used in printers (S7001). Next, whether the "inspection process" is selected or not is judged by the check box 5004 (S7002).

If at S7002, the inspection process is selected, the image data of one page is transmitted to the inspection device 500 (S7004). Next, whether the transmission of all pages has been completed or not is judged (S7005), and if the transmission of all pages is not completed, return is made to S7003 to transmit the next page.

Also, if at S7002, the inspection process is not selected, the image data of one page is transmitted to the image forming apparatus 100 (S7006). Next, whether the transmission of all pages has been completed or not is judged (S7007), and if the transmission of all pages is not completed, return is made to S7006 to transmit the next page.

If at S7005 or S7007, the transmission of all pages is completed, the printing task is finished.

The calculation of the degree of similarity between the data transmitted from the PC 700 to the inspection device 500 and transformed into the Bit Map format and the image data read by the output sheet reader 1007 in the inspection device 500 is as described in connection with FIGS. 8A and 8B.

The embodiments of the present invention have been described above. While in the foregoing description, the inspection device 500 has been described as an independent device, it may of course be integral with the image forming apparatus 100. Also, while the post-treating device 300 is mounted behind the detection device 500, this is not restrictive, but it may of course be a mere stacking portion such as a stacker. Also, while a CCD or a CIS has been mentioned as the reader, of course this is not restrictive.

What is claimed is:

1. An inspection device comprising:
 a reading section for reading an image on a sheet having the image formed thereon;
 an original image receiving section for receiving image data of an original;
 a storage section for storing the image data received by the original image receiving section; and
 a switching section for switching between a first mode for storing the image data received by the original image receiving section in the storage section and determining whether the image data received by the original image receiving section is similar to the image read by the reading section, and a second mode for determining whether the image read by the reading section is similar to the image data stored in the storage section, wherein the switching section switches between the first mode and the second mode according to what number copy the sheet is being read by the reading section.

2. The inspection device according to claim 1, further comprising a number-of-copies data receiving section for receiving number-of-copies data representing what number copy the sheet is having the image formed thereon, wherein the switching section switches to the first mode or the second mode according to a value of the number-of-copies data received by the number-of-copies data receiving section.

3. The inspection device according to claim 2, wherein the switching section switches so that the inspection device operates in the first mode when the number-of-copies data indicates the first copy and operates in the second mode when the number-of-copies data indicates the second and subsequent copies.

4. An image forming apparatus comprising:

a stacking section for stacking sheets;

a feeding section for feeding a sheet from the stacking section;

an image inputting section for inputting an image to be formed on the sheet fed by the feeding section;

an image forming portion for forming an image on the sheet on the basis of image data inputted by the image inputting section;

an image reading section for reading the image on the sheet on which the image has been formed by the image forming portion;

a storage section for storing the image data inputted by the image inputting section; and a switching section for switching between a first mode for storing the image data inputted by the image inputting section in the storage section and determining whether the image data inputted by the image inputting section is similar to the image read by the image reading section, and a second mode for determining whether the image data stored in the storage section is similar to the image read by the image reading section, wherein the switching section switches between the first mode and the second mode according to what number copy the sheet is being read by the reading section.

* * * * *

UNITED STATES PATENT AND TRADEMARK OFFICE
CERTIFICATE OF CORRECTION

PATENT NO. : 7,259,877 B2
APPLICATION NO. : 10/610584
DATED : August 21, 2007
INVENTOR(S) : Masaaki Inoo et al.

It is certified that error appears in the above-identified patent and that said Letters Patent is hereby corrected as shown below:

ON THE TITLE PAGE:
    At Item (56), References Cited, FOREIGN PATENT DOCUMENTS, "JP 2002-031990" should be deleted.

COLUMN 3:
    Line 37, "B" should read --$\underline{B}$--;
    Line 41, "C," should read --$\underline{C}$-- and "D" should read --$\underline{D}$--;
    Line 43, "B" should read --$\underline{B}$--; and
    Line 46, "A," should read --$\underline{A}$--.

COLUMN 4:
    Line 5, "C" should read --$\underline{C}$,--;
    Line 13, "C" should read --$\underline{C}$--;
    Line 16, "C" should read --$\underline{C}$--; and
    Line 45, "once" should read --first--.

COLUMN 5:
    Line 11, "is" should read --are--.

COLUMN 6:
    Line 47, "flow-chart" should read --flowchart--.

COLUMN 8:
    Line 62, "assume" should read --and assume--.

COLUMN 9:
    Line 25, "inspect" should read --inspects--; and
    Line 36, "when" should read --showing the case where--.

COLUMN 10:
    Line 33, "sheet is made" should read --a shift is made--;
    Line 34, "tee" should read --the--.

UNITED STATES PATENT AND TRADEMARK OFFICE
CERTIFICATE OF CORRECTION

PATENT NO. : 7,259,877 B2
APPLICATION NO. : 10/610584
DATED : August 21, 2007
INVENTOR(S) : Masaaki Inoo et al.

It is certified that error appears in the above-identified patent and that said Letters Patent is hereby corrected as shown below:

COLUMN 11:
Line 57, "is stored in the storage device 500" should be deleted.

COLUMN 13:
Line 4, "how manieth copy" should read --the number of copies--.

Signed and Sealed this

Third Day of June, 2008

JON W. DUDAS
*Director of the United States Patent and Trademark Office*